W. W. WILLS.
FERTILIZER DISTRIBUTING ATTACHMENT.
APPLICATION FILED NOV. 27, 1916.

1,258,515.

Patented Mar. 5, 1918.
2 SHEETS—SHEET 1.

WITNESSES

INVENTOR
William W. Wills
BY
ATTORNEY

W. W. WILLS.
FERTILIZER DISTRIBUTING ATTACHMENT.
APPLICATION FILED NOV. 27, 1916.

1,258,515.

Patented Mar. 5, 1918.
2 SHEETS—SHEET 2.

WITNESSES

INVENTOR
William W. Wills

BY

ATTORNEY

UNITED STATES PATENT OFFICE.

WILLIAM W. WILLS, OF PALMYRA, VIRGINIA.

FERTILIZER-DISTRIBUTING ATTACHMENT.

1,258,515.  Specification of Letters Patent.  Patented Mar. 5, 1918.

Application filed November 27, 1916. Serial No. 133,739.

*To all whom it may concern:*

Be it known that I, WILLIAM W. WILLS, a citizen of the United States, residing at Palmyra, in the county of Fluvanna and State of Virginia, have invented certain new and useful Improvements in Fertilizer-Distributing Attachments, of which the following is a specification.

The present invention relates to fertilizer distributers.

The invention has for its principal object to provide a fertilizer distributer in the form of an attachment for wagon bodies and one which can be affixed thereto with but little effort and also with but slight alteration to the wagon body; the attachment when applied serving as means for efficiently spreading or distributing fertilizer over a field or the like, whereupon when operations are completed, it can be equally as readily removed from the wagon body, thus permitting the wagon to be again used in its normal manner.

As an object of equal importance, the invention aims to provide a fertilizer distributing attachment for commercial vehicle bodies, which, when attached thereto, may be rendered inoperative, thereby allowing the operator to use the vehicle as a means for hauling the fertilizer from the source of supply to the desired point, whereat the distributer can be then rendered operative and consequently the spreading of the fertilizer carried on.

It is also an aim of the invention to provide an improved fertilizer distributing attachment provided with a novel form of cut-off means, whereby the discharge of fertilizer from the attachment may be properly governed or regulated.

Still further, the invention embodies a novel form of control means whereby the operation of the distributing attachment can be governed at will, the same being so constructed as to permit the simultaneous manipulation thereof and the cut-off means, consequently, reducing the use of labor and time to minimum.

Among other aims and objects of the invention may be recited the provision of an attachment of the character mentioned with a view to compactness, and in which the number of parts are few, the construction simple, the cost of production small, and efficiency and operation high.

Other and further improvements and novel details in the construction and arrangement of parts will be appreciated from the description to follow, which, for a clear understanding of the invention should be considered in connection with the accompanying drawings forming a part hereof and wherein the preferred embodiment of the invention is shown for the purpose of illustration.

Figure 1:
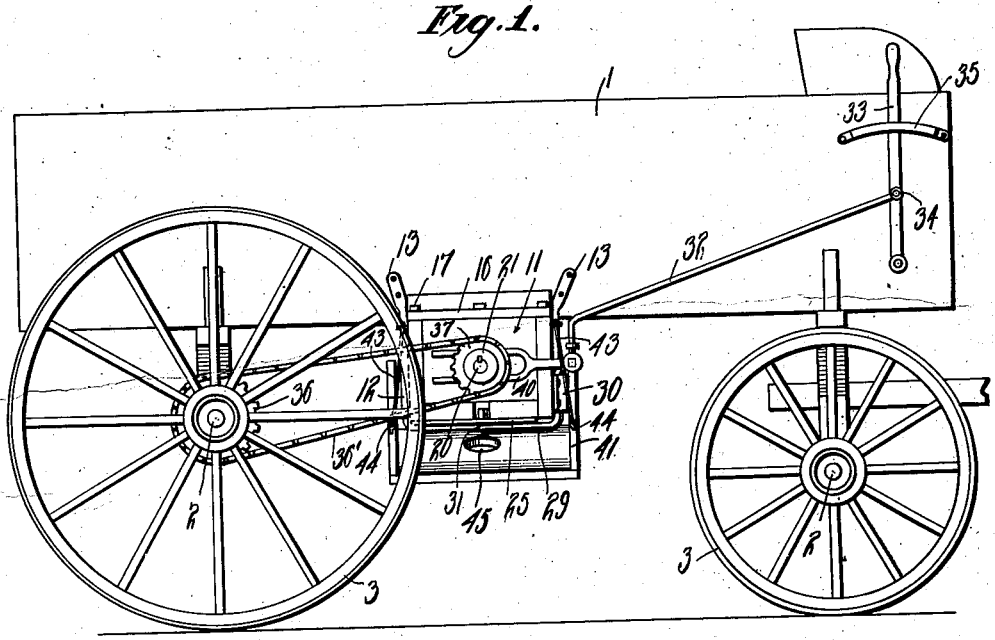
Figure 1 is a side elevation of my improved attachment applied to a wagon.
Figure 2:
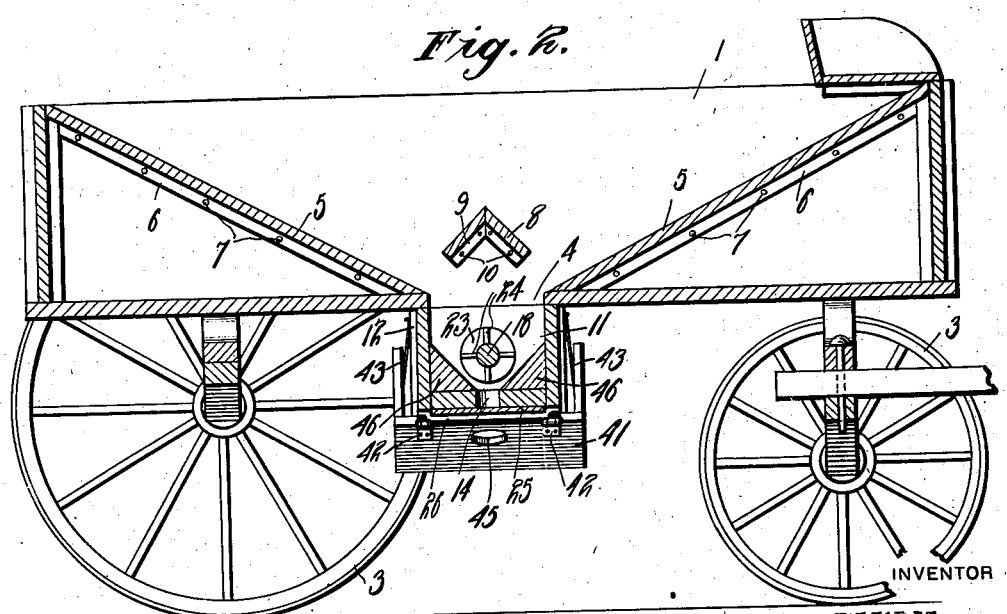
Fig. 2 is a longitudinal section of the wagon, parts being shown in elevation.

Referring now more particularly to the drawings wherein like reference characters designate corresponding parts throughout the several views thereof, I have shown for the purposes of illustration, the present improvements as applied to the conventional type of wagon ordinarily used for farming purposes, indicating the body thereof by the numeral 1, the front and rear axles by the numeral 2 and the wheels by the numeral 3.

To permit the attaching of my improved fertilizer distributer, which will be hereinafter more fully described, to the wagon body 1, a portion of the flooring thereof is removed, preferably at a point intermediate the ends thereof, thereby affording a transversely disposed opening 4. Inclined supports 5 are arranged within the wagon body 1 and have their lower ends arranged adjacent the sides of the transverse opening 4, while the upper ends thereof are approximately flush with the top of the said body 1. To rigidly secure the supports 5 in proper position, angle irons 6 or the like are engaged with the side portions thereof and then connected to the sides of the body 1 by suitable fastening devices 7 which are passed through the flanges of the irons 6 and the adjacent portions of the wagon body sides. A guard member 8 which may be and preferably is of substantially wedge shape is secured to the sides of the wagon body 1, directly above the transverse opening 4 through the medium of angle irons 9 which have passed through the free portions thereof, rivets 10, the said rivets, as will be understood, being embedded in the sides of the wagon. By providing the guard, it is obvious that the discharge of fertilizer from the hopper-like container as formed by the arranging of the supports 5 within the wagon body 1 will be efficiently regulated, that is, clogging or excessive discharge will be eliminated.

To the under face of the wagon body bottom 1 and in alinement with the transverse opening 4, there is secured a trough-like receiving container 11, the said container being held in fixed position by means of U-brackets 12 which are arranged about the opposite end portions thereof and then secured to the sides of the body 1, as at 13. Within the bottom of the receiving container 11, I form a plurality of discharge openings 14 and 15, the latter being of a greater diameter than the former, the purpose of which will be subsequently apparent. It is to be also noted, that the length of the container 11 exceeds the width of the wagon body 1 and therefore, those opposite end portions of the same which project beyond the sides of the said body 1 are closed by suitable cover plates 16, which cover plates are secured in position through the medium of bolts 17 or the like.

With a view toward providing means whereby the fertilizer as deposited within the container 11 may be discharged therefrom in an even manner, I rotatably mount within the same, a longitudinally disposed shaft 18, journaling the opposite ends thereof in the ends of the said container 11 as at 19. A reduced extension 20 is formed upon one end of the said shaft 18 and carries upon its outer end, an integral head 21, the inner face of which is provided with a plurality of radially disposed teeth 22, thus, affording an efficient clutch face. Upon that portion of the shaft 18 as arranged within the container 11, I affix a plurality of oppositely disposed spiral conveyers 23, extending the same to points in proximity to the middle of the shaft 18. On the remaining or middle portion of the shaft 18, I affix a plurality of radially extending staggered pins or fingers 24, which fingers serve as means for breaking up clods or lumps of fertilizer as discharged into the container 11, thereby, faciltating the distribution thereof and the discharge of the same through the discharge openings 14 and 15.

In order to provide means whereby the discharge of fertilizer through the openings 14 and 15 may be controlled by the operator, I slidably mount upon the under face of the container or distributer 11, a plate valve 25, securing the same in position by means of suitable brackets 26, these brackets in turn, being affixed to adjacent portions of the distributer bottom. A plurality of outlets 27 and 28 are formed in the valve 25, it being noted, that the outlets 27 correspond to the size of the discharge openings 14, while the outlets 28 correspond to the size of the discharge openings 15. An arm 29, pivotally supported as at 30 to one side of the distributer 11 is engaged with the adjacent end of the plate valve 25 as shown at 31 and has its remaining end extending at angles thereto whereupon it is engaged by the connecting rod 32 extending longitudinally of the wagon body 1 and secured to a hand lever 33 as at 34. The usual guide or quadrant 35 is arranged over the upper portion of the lever 33, thereby, affording means whereby the same may be guided and held in adjusted positions. By so connecting the plate valve 25, it will be understood, that the size of the discharge openings 14 and 15 may be minutely regulated by the operator, who also, may, at will, discontinue the distributing operation.

In this connection, attention is directed to the fact that the guide 35 will in actual practice be graduated, the graduations being numbered so that the operator may adjust the lever 33 to the desired one of the graduations and secure a corresponding distribution of material. While the drawing does not show the guides 35 as being graduated, it is to be understood that the graduations are to represent the weight of a certain amount of material which it is desired to spread over a given area. For instance should the operator desire to distribute 500 pounds of material over a given area of land, the lever 33 will be set at a corresponding mark representing such a distribution when the plate valve 25 will accordingly be moved to secure a corresponding registration of the openings 14 and outlets 27.

As a means for rotating or driving the shaft 18, there is fixedly mounted upon one rear wheel of the wagon, a sprocket wheel 36 about which a sprocket chain 36' is arranged, the remaining end of the said chain being extended forwardly and arranged about a second sprocket wheel 37 loosely mounted on the extension 20 of the shaft 18. A clutch element 38 is also slidably arranged upon the extension 20 and is affixed to the outer face of the sprocket wheel 37. To move the clutch element 38 into engagement with the clutch face 32, a collar 39 arranged upon the shaft extension 20 is provided and is connected also to the sprocket wheel 37. A yoke 40, having the bifurcated end thereof loosely engaged with the collar 39 is fixedly secured to the upper angular portion of the pivotal arm 29 and consequently, when the said arm 29 is shifted through the medium of the rod 32 and the hand lever 33, a sliding movement will be imparted to the clutch element 38, the sprocket wheel 37 and the collar 39, thus moving the former into engagement with the clutch face 22. By so connecting the clutch element, the sprocket wheel 37 will be caused to rotate with the sprocket wheel 36, thereby imparting a similar motion to the shaft 18 and causing such fertilizer as will be discharged into the distributer 11 to be pulverized and then discharged equally onto the ground. Obviously, to discontinue rotation of the shaft 18, the hand lever 33 is moved in a direction so as to cause disengagement of the clutch element 38 from the clutch face 22. Simultaneous with the disengagement of the clutch element, the slidable plate valve 25 will be moved to closed position, thereby preventing further discharge of the fertilizer. The attachment now rendered inoperative will obviously not interfere with the usage of the wagon for other various purposes.

Figure 3:
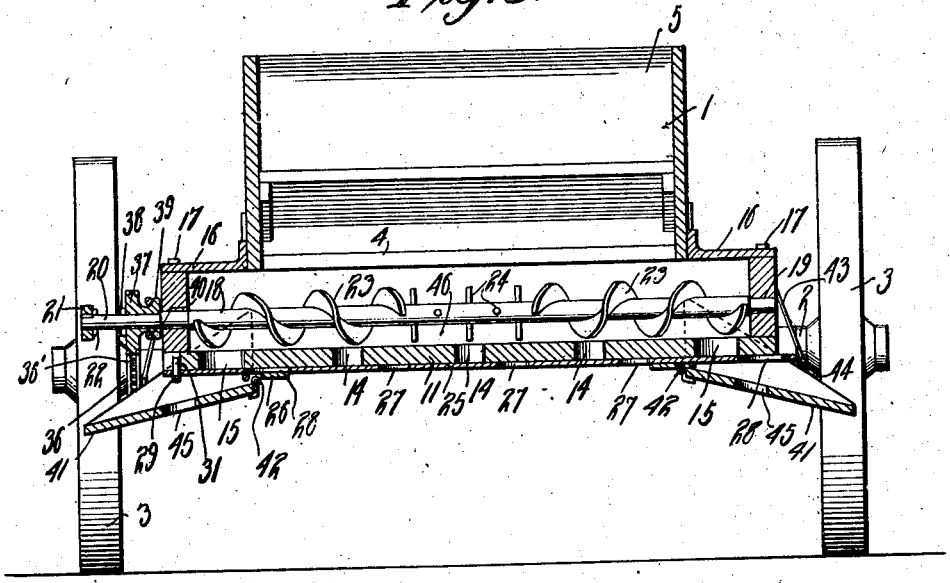
Fig. 3 is a transverse section.

Chutes 41 are pivotally connected to the under side of the distributer bottom by means of hinges 42 and have their outer ends extended slightly beyond the ends of the said distributer. For supporting the said chutes in inclined positions as shown in the Fig. 3, rods 43 are received in eyes 44 secured to the chutes and are in turn, affixed to the end of the distributer. By providing the chutes 41, it will be noted, that such fertilizer as deposited thereon from the discharge openings 15 will be directed to one side of the wagon in such a manner as to permit the covering or fertilizing of a greater area of ground. Discharge openings 45 may be and preferably are formed in the bottoms of the chutes 41 and will permit a portion of the fertilizer as received thereon to be passed therethrough, thus facilitating an even spreading of the same. By forming the openings 15 of greater diameter than the openings 14, it will be appreciated, that a sufficient amount of fertilizer will be discharged onto the chutes 41 to permit the ground thereunder to be properly covered. In this connection, it is to be understood, that if the operator desires, the rods 43 may be disengaged from the ends of the distributer 11 in order that the spreading of the fertilizer may be limited or regulated.

If desired, the container or distributer 11 may be provided with inclined filler blocks 46, the lower ends of which aline with the various discharge openings 14 and 15. Thus, the fertilizer within the distributer will be directed through said discharge openings and waste thereof, due to lodging of the same in the otherwise flat bottom thereof will be avoided.

Figure 4:
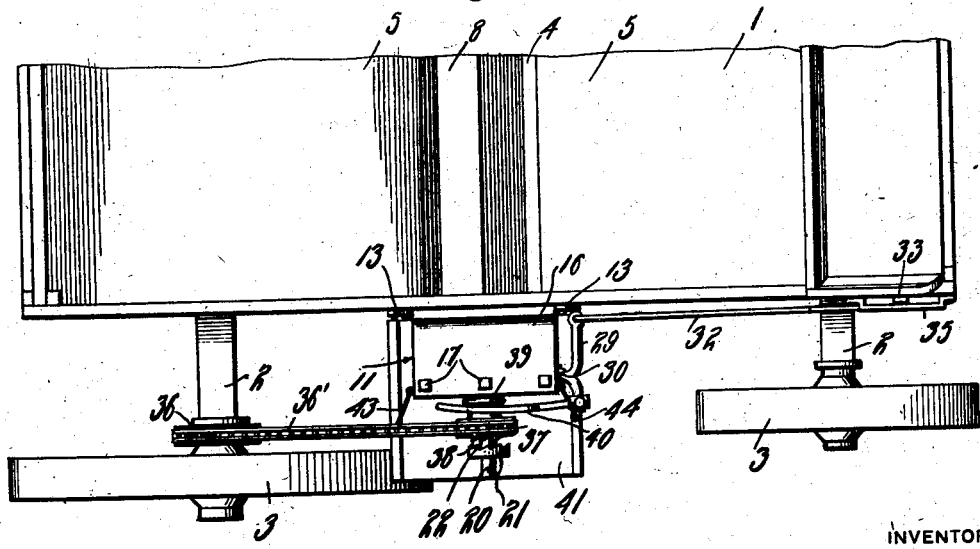
Fig. 4 is a top plan showing more particularly the clutch devices.

The operation of the device is as follows: Attention is directed more particularly to Fig. 4 of the drawings, wherein it will be seen upon movement of the lever 33 the arm 29 will be rocked upon its fulcrum 30. The pin 31 carried by the arm 29 will accordingly move the plate valve 25 outwardly or toward the left in Fig. 3 when the respective outlet in the plate 25 will be moved in registration with the openings in the bottom 11 of the distributer. The area of the opening for the discharge for the material from the distributer 11, of course depends on the distance through which the lever 33 was moved. The initial movement of the lever 33 in rocking the arm 29 also causes the clutch 39 to be moved into engagement with the fixed clutch 22. This occurs on the initial movement of the lever 33 as above stated, and should it be desired to provide discharge openings of greater area, the lever 33 may be moved still farther when the respective openings 27 and 14 will be moved into fuller alinement. The continued movement of the lever 33 is permissible because of the arcuate arm 40 which, after the clutch element has been moved into engagement, simply slides over the concave surface of the collar 39 and thereby permits any range of adjustment of the plate valve 25 after the clutch element has been thrown into engagement.

From the foregoing, it will be appreciated by workers in the art, that I have provided a fertilizer distributing attachment which will eliminate the necessity of extensive outlay in the heretofore complex apparatus used for this purpose. Furthermore, the device by being provided with a combined conveyer and agitating means, such as formed by the spirals 23 and the staggeredly arranged fingers 24, will prevent the uneven distributing or spreading of fertilizer over a field and also will prevent the clogging of the attachment. Again, by providing means whereby the operator upon moving the hand lever 33 will simultaneously operate the slidable plate valve 25 and the clutch element 38, time and labor will be reduced to minimum.

While I have herein illustrated and described with a considerable degree of particularity constructional details of the attachment embodying my invention, it is to be understood that the invention is not limited to the particular form and arrangement of the several parts, which may be modified within a wide range without departing from the essence of the invention, the construction shown and the description based thereon being intended to be taken in an illustrative rather than a limiting sense.

I claim:

1. A fertilizer distributer, the combination with a container having a discharge opening, a valve for the opening, a conveyer in the container the conveyer having a shaft, sprocket and clutch devices on the shaft, a pivoted arm having connection with the valve, a lever on the arm, the lever having a curved end in engagement with the sprocket and clutch devices, and means for operating the pivoted arm whereby the valve is moved across the opening and the sprocket and clutch devices brought into operative engagement, the curved end of said lever permitting subsequent adjustments of the valve without affecting the sprocket and clutch devices.

2. A fertilizer distributer, the combination with a container having a small and a large discharge opening, a conveyer in the container for urging material toward the openings, a valve for the openings, and a chute pivoted below the large opening said chute having an opening, said chute being adapted to distribute material laterally of the conveyer.

3. A fertilizer distributer, the combination with a container, a conveyer in the container the conveyer having a shaft extending without the container, a fixed clutch member on the shaft, a slidable sprocket on the shaft, the sprocket having a clutch base and a concave groove, a valve associated with the container, and a pivoted arm having engagement with the valve whereby the valve is moved, said arm including a lever having a curved extension movable in the concave groove whereby the clutch elements are brought into operative engagement, said curved extension permitting subsequent movement of the pivoted arm to move the valve independently of the engagement of the curved arm with the concave groove.

4. A fertilizer distributer including a wagon body having a container with a discharge opening, cut off means for the discharge opening, a conveyer shaft movable in the container, a clutch member fixed on the shaft, a coacting driving clutch member slidable on the shaft, and a bell crank having a pivotal connection with the cut off means and a sliding connection with the slidable clutch member whereby the clutch member and cut off means are shifted together and subsequent adjustments of the cut off means may be obtained.

5. In a fertilizer distributer, the combination with the valve and the conveyer shaft having a fixed clutch member, of a sliding clutch member on the conveyer shaft with a shifting collar, an arm pivoted to the valve, and a lever on the arm having a shifting action on the shifting collar, and a subsequent sliding action on the collar whereby adjustments of the valve may be obtained.

6. In a fertilizer distributer, the combination with the container having discharge openings, means for working material in the container toward the discharge openings, and means located beneath the discharge openings for receiving and spreading the material laterally and beyond the confines of the distributer.

7. In a fertilizer distributer, the combination with the container having discharge openings, slanting inserts for directing material toward the openings, said inserts extending the length of the distributer, means for agitating and working the material toward the openings, and receiving means beneath the discharge openings for spreading the material.

In testimony whereof I affix my signature in presence of two witnesses.

WILLIAM W. WILLS.

Witnesses:
M. E. JONES,
M. A. O'CONNOR.